Dec. 27, 1955  H. S. HOWE ET AL  2,728,612
TRACK BELT
Filed Oct. 20, 1952
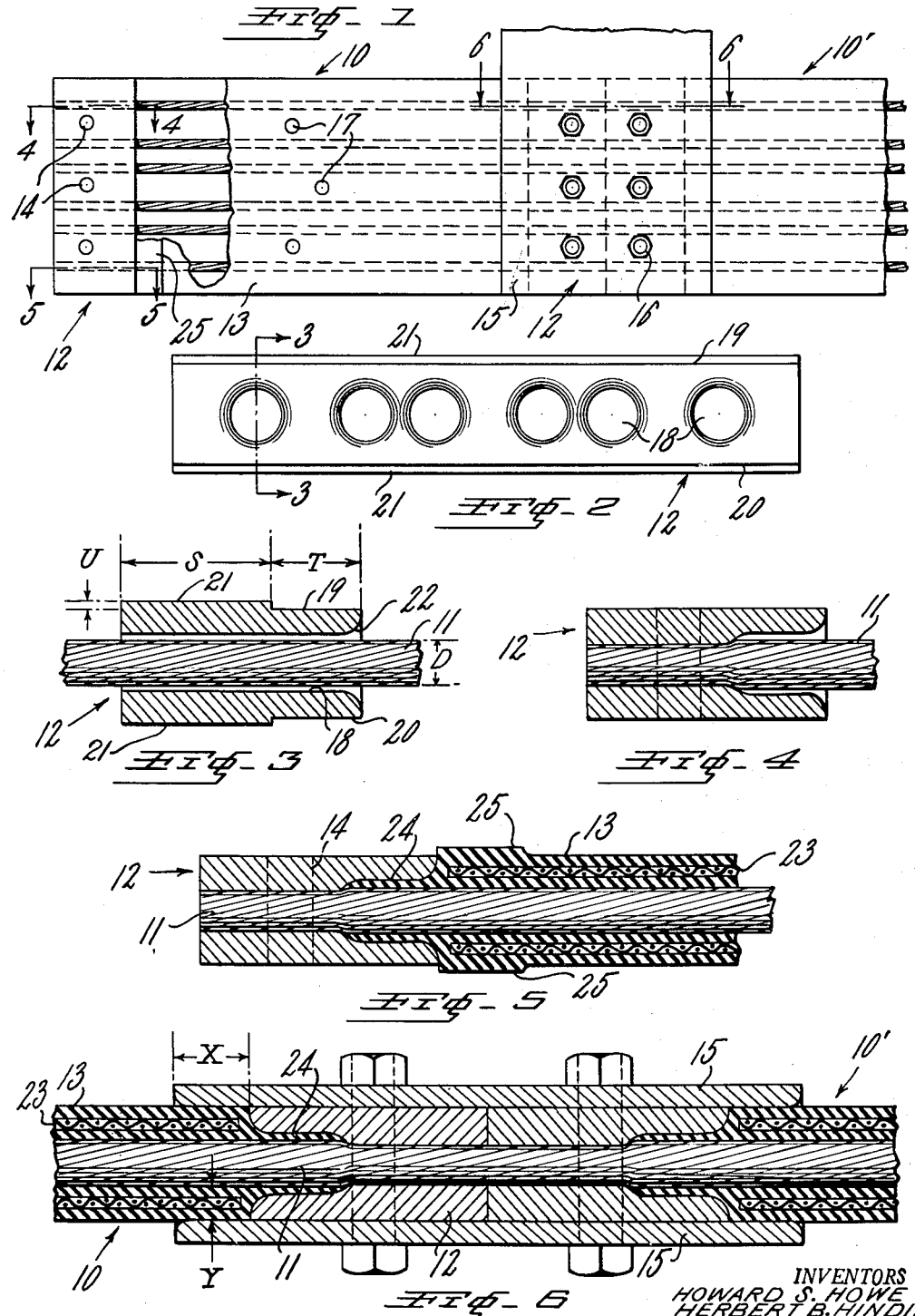
INVENTORS
HOWARD S. HOWE
HERBERT B. FINDIN
CROCKETT MOSSHART
BY
Irwin M. Lewis
ATTORNEY United States Patent Office 2,728,612
Patented Dec. 27, 1955

2,728,612

TRACK BELT

Harold S. Howe, Detroit, Herbert B. Hindin, St. Clair Shores, and Crockett Messhart, Detroit, Mich., assignors to United States Rubber Company, New York, N. Y., a corporation of New Jersey Application October 20, 1952, Serial No. 315,724

7 Claims. (Cl. 305—10)

This invention relates to tracks for tanks and other types of track laying vehicles. More particularly this invention relates to sectional tracks for such vehicles made of short belt sections which are connected together to form a continuous belt to which ground engaging cleats may be secured. These belt sections are made of one or more twisted wire cables or ropes which are embedded in rubber or a combination of rubber and fabric. The rubber serves as a protective covering and insulation for the wire cables.

Difficulty has been experienced at the point that the belt sections are connected together by reason of fatigue failure of the cables due to the repeated, severe, localized bending the cables are subjected to at this point as the track passes around the wheels of the vehicles.

The primary object, therefore, of the present invention is to provide a belt and an end connector construction which will control the bending of the cable to minimize the fatigue failure of the cables at the point that the track belts are connected together to thereby increase the life of the track belts in service. To this end, the present invention consists of a special end connector for the cables which will tightly grip and anchor the ends of the cables and will support without gripping a portion of the cables adjacent the tightly gripped ends to thereby support the cables against bending for a substantial distance beyond the gripped ends while allowing the individual strands and wires of the cables to shift over this distance. The invention also contemplates a special construction for the rubber portion of the belt adjacent the end of the belt and a special connector plate construction which will place the rubber under compression to cushion and control the bending of the cables for a substantial distance from the end connector.

Other objects and advantages will become apparent from the following description when read in conjunction with the accompanying drawings wherein:

Fig. 1 is a plan view of the track belt section of the present invention showing one end thereof coupled to a similar track belt section;

Fig. 2 is a side view of the cable and connector of the present invention showing the bores therein for receiving the ends of the cables;

Fig. 3 is an enlarged sectional view taken on the line 3—3 of Fig. 2 showing an end of one of the cables inserted through one of the bores of the cable connector preparatory to securing it therein;

Fig. 4 is an enlarged sectional view taken on the line 4—4 of Fig. 1 showing the end of one of the cables inserted through one of the bores of the end connector and secured therein and trimmed flush with the end face of the connector;

Fig. 5 is an enlarged sectional view taken on the line 5—5 of Fig. 1 showing the end connector with the end of one of the cables secured therein and the special construction of the rubber covering adjacent the end connector; and Fig. 6 is an enlarged sectional view taken on the line 6—6 showing the details of the connecting structure between two sections of track belt showing how the rubber covering is compressed adjacent the end connectors.

In Fig. 1, the track belt of the present invention, generally designated by the reference numeral 10, is shown connected to a similar, partially shown, section 10'. The track belt 10 includes a plurality of twisted wire cables 11 and end connectors 12 in which the ends of the cables 11 are anchored. While the cables 11 are shown in spaced parallel relationship in the drawing, it is to be understood that they can be disposed in non-parallel relationship if so desired. The cables are embedded in a covering 13 of rubber or a combination of rubber and fabric to protect them against abrasion. The cables 11 and the faces of the end connectors 12 which are in contact with the rubber covering 13 are brass plated or otherwise treated to effect an adhesive bond. It is to be understood that the term rubber is used herein in its generic sense to include natural and synthetic rubber and plastic materials exhibiting rubber-like properties.

The end connectors 12 are provided with bolt holes 14 so that a number of belt sections, similar to belt section 10, may be connected together by means of connector plates 15 and bolts 16 as shown at the right-hand end of Fig. 1 and in the sectional view of Fig. 6, to form a continuous belt for track laying vehicles. The connector plates 15 may have ground engaging cleats (not shown) secured thereto or formed integral therewith. Additional cleats may be bolted to the track belt 10 by means of bolts or rivets which pass through holes 17 provided in the track belt 10 at spaced intervals.

As best shown in Figs. 2 and 3, the end connectors 12 are in the form of elongated, metal blocks provided with a plurality of spaced, parallel bores 18 extending therethrough, through which the individual ends of the cables 11 are inserted. The diameter of the bores 18 are substantially equal to but slightly larger than the diameter D of the cables 11 to provide clearance so that the ends of the cables 11 can be easily inserted therein. Opposed parallel sides 19 and 20 are provided with longitudinally extending swedging ribs 21 which overlie a substantial portion of the ends of the bores 18 and which when swedged down flush with the sides 19 and 20 reduce the bores 18 over the distance designated by the dimension S in Fig. 3 so that the ends of the cables 11 are tightly gripped and anchored over this distance.

Over the distance designated by the dimension T, each cable 11 is supported against bending but is not gripped so that the individual strands and wires of the cable 11 can shift and/or twist. It has been found that by supporting the cables 11 against bending for a substantial distance past the point that they are gripped, while allowing the individual strands and wires to be free to twist and/or shift over this distance, that the fatigue life of the cables is remarkably increased when subjected to severe localized bending. This is apparently due to the fact that a twisted wire cable is quite rigid for a substantial distance from the point that it is anchored and is therefore more subject to fatigue failure in this distance. By supporting the cable against bending over this distance, the bending point is shifted to a more flexible section of the cable. By allowing the individual wires and strands to shift and/or twist in the supported distance, the flexibility of the cable adjacent the supported section of the cable is not affected as the individual wires and strands may shift and/or twist to accommodate bending.

The provisions of the swedging ribs 21, insures that sufficient swedging metal and swedging area is provided to give proper anchoring without damage to the cable and that the swedging is localized so that it does not affect the remaining portions of the end connector 12.

Adequate fatigue life has been obtained when the dimension T is equal to or in excess of 1½ times the diameter D of the cable. Adequate gripping and anchoring of the cable has been obtained when the height of the swedging ribs, designated by the dimensions U in Fig. 3 is maintained between .30 and .65 times the diameter D of the cable 11 and the dimension S is made to be no less than 2 times the diameter D of the cable.

The bores 18 are rounded at the ends 22 thereof, to prevent chafing of the cables 11 at the point that they extend from the bores 18.

The fatigue life of the cables 11 is further enhanced by the special belt construction and connector plate construction shown in Figs. 1, 5 and 6. As shown in Fig. 5, the rubber covering 13 may be of a ply construction and include a ply of fabric 23. The covering 13 is molded on the cables and in the molding operation, some of the rubber penetrates into the clearance between the cables 11 and end connector 12 as shown at 24 in Fig. 5. This provides cushioning for the cables and protects them against moisture. Referring to Fig. 6, the connector plates 15 are made sufficiently wide that they extend beyond the edge of the end connectors 12 a substantial distance and overlie the rubber covering 13. The overhang of the plates 15 beyond the end connectors 12 and the rubber covering 13 between the plates 15 serve to cushion and control the bending of the cables 11 for a substantial distance from the end connectors 12. Adequate performance has been obtained when the overhang of the plates 15, designated by the dimension X in Fig. 6, is in excess of 2 times the diameter D of the cables 11 and the distance between the cable and the plates 15, designated by the dimension Y in Fig. 6, is in excess of ½ the diameter D of the cables 11.

The rubber covering 13 may be made slightly thicker than the end connectors 11 adjacent the point that the rubber covering abuts the end connectors 12 by providing integral rubber ribs 25 which extend across each side of the belt. When the plates 15 are pulley together by tightening the bolts 16, the rubber ribs 25 are placed under compression to such an extent that even under severe bending, the rubber presses tightly against the end connectors 12 and the cables 11 to thereby effect a seal against moisture at this point as well as cushion the cables.

The edges of the plates 15 are rounded to prevent chafing of the belt 10 when it is bent in passing around the wheels of the vehicle.

In fabricating the belt 10, the ends of the cables 11 are first inserted through the bores 18 until a portion thereof extends from the opposite end as shown in Fig. 3. The swedging ribs 21 are then swedged down flush with the opposed parallel sides 19 and 20 of the connector blocks 12 to tightly grip and anchor the cable ends in the bores 18 and the portions of the cables 11 extending beyond the end of the connector 12 are cut off flush with the end of the connector as shown in Fig. 4. The bolt holes 14 are drilled and the rubber or rubber and fabric cover 13 is then molded on the cables 11.

From the above description, it can be seen that there is provided a track belt construction for track laying vehicles which will greatly increase the fatigue life of the twisted wire cables. This construction, supports the cable against bending for a substantial distance from the point where it is anchored to the end connector while allowing the individual wires and strands of the cable to shift and/or twist freely so that the flexibility of the cables at the point that they extend from the end connector is not affected. The special construction of the connector plates and the covering for the belt, cushions and controls the bending of the cables so that severe localized bending is prevented in the crucial area adjacent the end connectors.

It is to be understood that the above description and accompanying drawings is for the purpose of illustration only and not by way of limitation and changes and modifications may be made therein without departing from the spirit and the scope of the invention.

Having thus described our invention, what we claim and desire to protect by Letters Patent is:

1. A track belt for track laying vehicles comprising, a length of twisted wire cable, a connector block for each end of said cable, a bore of substantial length in each of said connector blocks, each end of said cable extending through one of said bores, a rubber covering for said cable, said rubber covering abutting against said connector blocks, each bore being reduced in diameter for a substantial length thereof adjacent one end thereof to tightly grip and anchor the end of said cable, the remainder of said bore being of a substantial length and of a diameter to support the cable against bending for a substantial distance past the gripped end while allowing the individual strands and wires of the cable to shift and twist and means secured to said connector block for placing said rubber cover under compression adjacent the connector blocks.

2. A track belt for track laying vehicles comprising, a length of twisted wire cable, a connector block for each end of said cable, each of said connector blocks having opposed parallel sides and a bore of substantial length therein parallel to said sides, each end of said cable extending through one of said bores, a rubber covering for said cable, said rubber covering abutting against said connector blocks, and having a normally uncompressed thickness in the region adjacent said connector blocks greater than the distance between said opposed parallel sides, each bore being reduced in diameter for a substantial length adjacent one end thereof to tightly grip and anchor the end of the cable, the remainder of said bore being of substantial length and of a diameter to support the cable against bending for a substantial distance past the gripped end while allowing the individual wires and strands of the cable to shift and twist, a flat connector plate secured to each of said parallel sides and extending from said connector block in the same direction as said cable and engaging said rubber covering adjacent said connector block to compress said rubber covering to cushion the bending of the wire cable and seal the cable against foreign material at the point it enters said bores.

3. A track belt for track laying vehicles comprising, a plurality of twisted wire cables, an elongated substantially rectangular connector block for each end of said cables, each of said connector blocks having a plurality of spaced bores of substantial length extending into said block from one longitudinally extending side thereof, said bores receiving the individual ends of said cables, said bores being reduced in diameter adjacent the end thereof remote from said one longitudinally extending side to tightly grip and anchor the cables over a substantial length thereof, the remainder of the length of said bores being of a diameter to support the cables against bending while allowing the individual wires and strands of the cables to shift and twist and being of a length to so support the cables against bending over a substantial distance from the gripped end of the cables.

4. A track belt for track laying vehicles comprising, a plurality of twisted wire cables, an elongated substantially rectangular connector block for each end of said cables, each of said connector blocks having a plurality of spaced bores of substantial length extending into said blocks from one longitudinally extending side thereof, said bores receiving the individual ends of said cables, said bores being reduced in diameter adjacent the end thereof remote from said one longitudinally extending side to tightly grip and anchor the cables over a substantial length thereof, the remainder of the length of said bores being of a diameter to support the cables against bending while allowing the individual wires and strands of the cables to shift and twist and being of a length to so support the cable against bending over a substantial distance from the gripped end, a rubber covering for said cables, said rubber covering abutting said one longitudinally extending side of said connector blocks, said rubber covering having an uncompressed thickness adjacent the connector blocks substantially greater than the thickness of said connector blocks, connector plates secured on opposite sides of said connector blocks and extending over said rubber cover a substantial distance and compressing said rubber cover adjacent said connector blocks to cushion the bending of the cables.

5. A cable end connector for track belts comprising, an elongated substantially rectangular metal block having a plurality of cable end receiving bores extending into said block from one longitudinally extending side thereof between the other two longitudinally extending parallel sides, an integral longitudinally extending swedging rib of substantial height and width on each of said other two longitudinally extending sides, said ribs overlying a substantial portion of said bores adjacent the end thereof remote from said one longitudinally extending side, the length of the remaining portion of said bores being such as to support a cable when received therein against bending for a substantial length thereof.

6. A track belt for track laying vehicles comprising, a plurality of twisted wire cables, an elongated substantially rectangular connector block for each end of said cables, each of said connector blocks having a plurality of spaced bores of substantial length extending into said blocks from one longitudinally extending side thereof, said bores receiving the individual ends of said cables, a rubber cover for said cables, said rubber cover abutting said one longitudinally extending side of said connector blocks, connector plates secured on opposite sides of said connector blocks and extending over said rubber cover a substantial distance to control the bending of the cables adjacent the connector blocks.

7. A track belt for track laying vehicles comprising, a length of twisted wire cable, means rigidly secured to the ends of said cable for connecting said cable to another similar cable, means for supporting said cable against bending for a substantial distance from said securing means while allowing the individual strands and wires of the cable to twist and shift, and means for cushioning and controlling the bending of said cable for a substantial distance past said means for supporting said cable.

References Cited in the file of this patent

UNITED STATES PATENTS

| | | |
|---|---|---|
| 1,970,756 | Lamb | Aug. 21, 1934 |
| 2,025,999 | Myers | Dec. 31, 1935 |
| 2,133,653 | Bomford et al. | Oct. 18, 1938 |
| 2,326,719 | Myers | Aug. 10, 1943 |
| 2,385,453 | Leguillon | Sept. 25, 1945 |
| 2,387,802 | Mayne | Oct. 30, 1945 |
| 2,402,042 | Haushalter | June 11, 1946 |